July 13, 1926.
E. G. DANN
BUMPER FOR VEHICLES
Filed Dec. 14, 1922
1,592,519
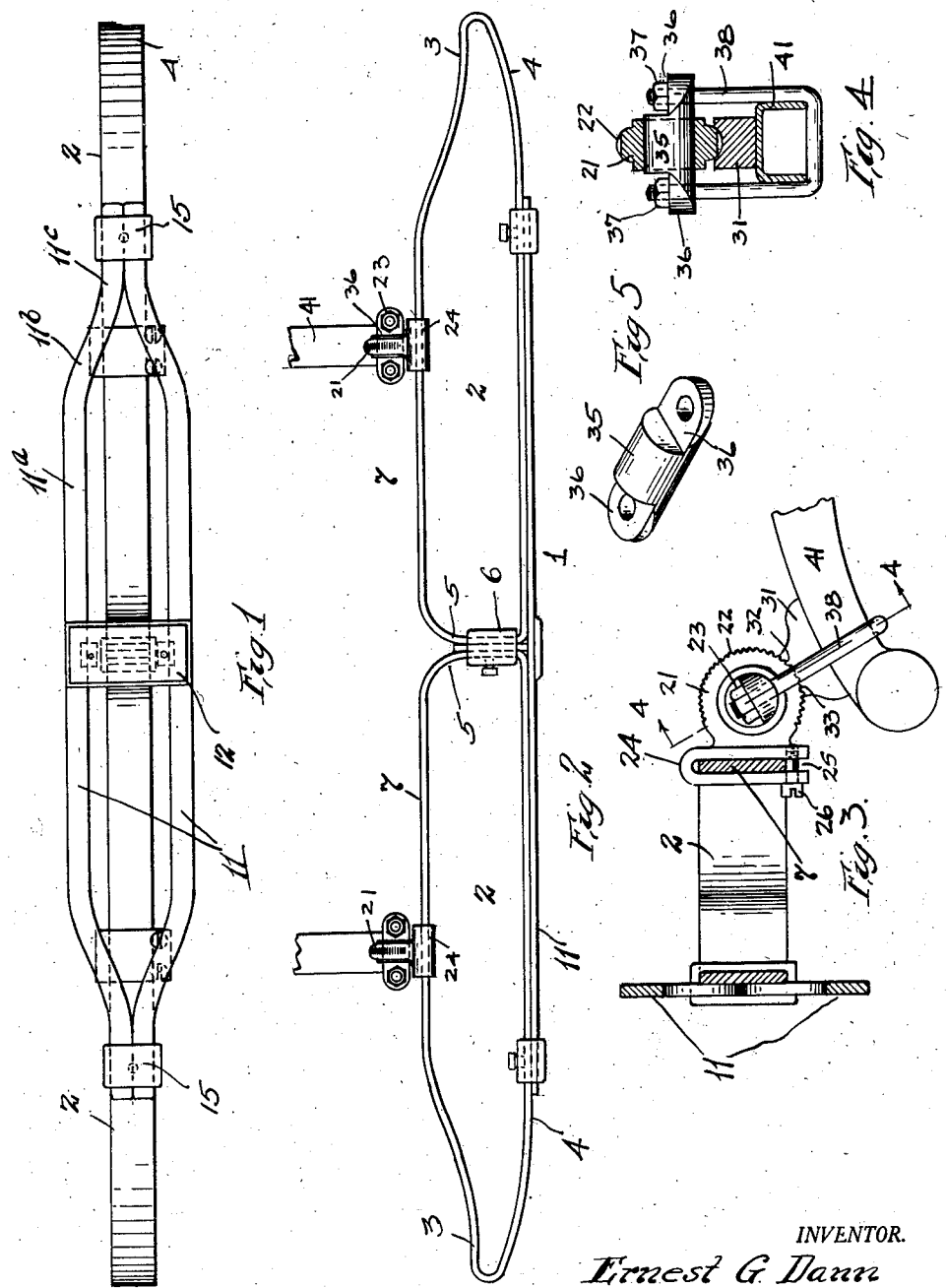
INVENTOR.
Ernest G. Dann
BY
Guy, Oberlin & Fay
ATTORNEYS Patented July 13, 1926.

1,592,519

UNITED STATES PATENT OFFICE.

ERNEST G. DANN, OF CHICAGO, ILLINOIS.

BUMPER FOR VEHICLES.

Application filed December 14, 1922. Serial No. 606,793.

This invention comprises a spring bumper and is of the type especially adapted for motor vehicles. More particularly it relates to a bumper wherein a plurality of spring cushioning members are placed in horizontal alinement across the frame of a vehicle and have associated therewith a plurality of impact bars connecting the central sections of the first named members. The impact bars are preferably two in number and are of identical shape, the end portions being displaced vertically from the main body portions and connected by angular intermediate sections.

Spring bumpers, as heretofore constructed, have usually included members extending completely across the front of the vehicle or combining front sections of the bumper with rearwardly extending supporting arms therefor. Bumpers of this type are quite unwieldy before being placed in position and even when disassembled for shipping involve a considerable wastage of space. Furthermore, such bumpers, when provided with outwardly bowed end supports, must be constructed of stock of heavier gauge than where intermediate supports are provided. In addition to the disadvantages mentioned, such bumpers are expensive to manufacture, requiring special lengths of spring strip material, and special bending and tempering apparatus and the rate of production is necessarily limited.

The object of the present invention is to supply an improved type of bumper which will have superior qualities in the matter of ability to withstand severe shocks and at the same time be of a character to require a less weight of material than the bumpers heretofore referred to.

It is a further object of the invention to provide a bumper formed of relatively short sections which may be easily joined to one another and when so assembled will be capable of presenting a resistance to impact and affording shock absorbing qualities equal to bumpers of much heavier design.

It is also an object of the invention to provide an efficient bumper capable of being shipped in compact knockdown form and to have parts which are of an interchangeable type and of a limited variety of shapes. Other objects of the invention will appear in the course of the following description. To the accomplishment of the foregoing and related ends, said invention, then, consists of the means hereinafter fully described and particularly pointed out in the claim.

The accompanying drawing, and the following description set forth in detail certain mechanism embodying the invention, such disclosed means constituting, however, but one of various mechanical forms in which the principle of the invention may be used.

In said accompanying drawing:—

Fig. 1 is a front elevation of the improved bumper; Fig. 2 is a top plan view of the bumper as applied to the frame of an automobile; Fig. 3 is an enlarged detail sectional view showing the bumper applied to the front end of the frame of an automobile; Fig. 4 is a sectional detail view taken along the line 4—4 shown in Fig. 3 looking in the direction of the arrows; and Fig. 5 is an enlarged detail perspective view of the cross-bar over which the bumper supporting bracket is engaged.

As is clearly shown in Figs. 1 and 2 of the drawing, the bumper 1 comprises a pair of horizontally positioned loops 2, of spring metal of elongated shape, and supporting and impact elements connected therewith. The bumper may be attached to either the front or rear end of the vehicle. The outer or free ends 3, of the loops are tapered adjacent their outer portions 4, and the central or inner end portions 5 of the respective loops are disposed at right angles to the adjacent body portions thereof and are adapted to be held in close relation to each other by means of a metal clip 6 embracing said end sections. Inwardly of said clip the loops are curved gradually to each side, merging with the straight sections 7 of the inner portion. Obviously the loops are exact counterparts in that they may be turned end for end and used on either side of the bumper. Outwardly of the loops a pair of impact bars 11 are positioned. These impact bars are of approximately one-half the width of the loop portions of the bumpers and are preferably constructed of light, tempered, metal strips such as are ordinarily used in vehicle springs.

Each of the impact bars is of identical shape and comprises a straight central portion 11$^a$ connected by means of inclined intermediate portions 11$^b$ with short straight end sections 11$^c$ parallel with and off-set with respect to the central portion. A pair of impact bars is held reversely positioned with respect to each other by means of a central plate 12 rigidly secured thereto and the end portions of said bumpers in vertical alinement with each other are connected adjacent the central portions of each of the loop sections, heretofore referred to, by means of a metal clip 15 which is adapted to hold the same securely against said loop portion.

The means for attaching the bumper unit just described to the frame of the automobile comprises brackets, the detail construction of which is clearly shown in Figs. 3, 4 and 5 of the drawing. These brackets comprise body members 21 of substantially circular vertical outline, having circumferential serrations 22 and provided centrally with a circular opening 23 of relatively large diameter. Adjacent one side of said body portions inverted U-shaped clamping members 24 are formed integrally therewith and present a spaced opening 25 of a width adapted to receive the inner portion of the loop sections of the bumper. A bolt 26 passing through alined apertures adjacent the open end of the inverted U-shaped portion serves to lock the bumper section in position by means of a screw threaded engagement of said bolt with a screw threaded section of the inner opening through said section. The body member of the bracket is adapted to rest upon a shoe 31 having an upper face 32 conforming to the curvature of the serrated circumference of the body members and being provided with indentations 33 to interlock with said serrations. By means of a crossbar 35 of comparatively large diameter with respect to its length and of a size suitable to fit closely within the central opening of the body section of the bracket, the parts are adapted to be rigidly clamped adjacent the end portions of the frame members of an automobile. The ends 36 of the cross-bar project to each side of the bracket body and are preferably cut away above a horizontal plane through the axis of the bar so as to form seats against which nuts 37 screwed upon the threaded ends of a U-bolt 38 may bear. The U-bolts are formed of a size to surround the ends of the frame 41 or equivalent structure of the vehicle.

From the above description it will be obvious that a bumper embodying the necessary degree of strength to withstand a severe shock may be formed of comparatively light strip material in relatively short lengths and when assembled will be capable of adjustment to an automobile in the proper position for effective protection thereof. The resilient portions of the bumper may be readily manufactured from short sections of metal strips of the character usually supplied to plants engaged in vehicle spring manufacture and economical and rapid production may be effected without the use of complicated and expensive special equipment.

Other modes of applying the principle of my invention may be employed instead of the one explained, change being made as regards the construction herein disclosed, provided the means stated in the following claim or the equivalent of such stated means be employed.

I therefore particularly point out and distinctly claim as my invention:—

In an article of the character described, the combination of a pair of individual horizontally positioned resilient loops in transverse alinement with each other, a pair of transversely extending impact bars connected with the outer portions of said loops adjacent their respective outer ends, means connecting the inner ends of said loops and the central portions of said impact bars and supporting members secured to said loops and adapted to be adjustably connected to the frame of a vehicle.

Signed by me, this 4th day of December, 1922.

ERNEST G. DANN.